US007721952B2

(12) United States Patent
Leeper

(10) Patent No.: US 7,721,952 B2
(45) Date of Patent: May 25, 2010

(54) PRESENTING MISALIGNED STACKS OF MEDIA

(75) Inventor: Kevin G. Leeper, Angus (GB)

(73) Assignee: NCR Corporation, Duluth, GA (US)

( * ) Notice: Subject to any disclaimer, the term of this patent is extended or adjusted under 35 U.S.C. 154(b) by 351 days.

(21) Appl. No.: 11/888,687

(22) Filed: Aug. 2, 2007

(65) Prior Publication Data

US 2009/0033020 A1 Feb. 5, 2009

(51) Int. Cl.

*G06Q 40/00* (2006.01)
*G07D 11/00* (2006.01)
*G07F 19/00* (2006.01)
*G06K 5/00* (2006.01)
*B65H 9/12* (2006.01)

(52) U.S. Cl. ........................ 235/379; 235/380; 271/241

(58) Field of Classification Search ................. 235/379, 235/380; 271/241; 705/43; 902/8, 9, 13, 902/14, 16, 17

See application file for complete search history.

(56) References Cited

U.S. PATENT DOCUMENTS

| | | | | | |
|---|---|---|---|---|---|
| 3,880,320 | A | * | 4/1975 | Morello et al. | 221/9 |
| 4,154,437 | A | * | 5/1979 | Butcheck et al. | 271/6 |
| 4,417,137 | A | * | 11/1983 | Lundblad | 235/379 |
| 4,482,058 | A | * | 11/1984 | Steiner | 209/534 |
| 4,549,661 | A | * | 10/1985 | Morishita et al. | 209/534 |
| 4,567,358 | A | * | 1/1986 | Takamatsu et al. | 235/379 |
| 4,889,978 | A | * | 12/1989 | Koshida et al. | 235/379 |
| 5,253,167 | A | * | 10/1993 | Yoshida et al. | 705/43 |
| 5,330,316 | A | * | 7/1994 | Buckman et al. | 414/790.2 |
| 5,335,484 | A | * | 8/1994 | Hain | 53/582 |
| 6,073,837 | A | * | 6/2000 | Milne | 235/379 |
| 6,516,998 | B2 | * | 2/2003 | Calder et al. | 235/381 |
| 6,607,081 | B2 | * | 8/2003 | Graef et al. | 209/534 |
| 6,824,047 | B2 | * | 11/2004 | Katou et al. | 235/379 |
| 6,978,928 | B2 | * | 12/2005 | Shibata et al. | 235/381 |
| 7,049,572 | B2 | * | 5/2006 | Jespersen et al. | 250/205 |
| 7,242,486 | B2 | * | 7/2007 | Jespersen et al. | 356/614 |
| 7,407,090 | B2 | * | 8/2008 | Jantsch | 235/379 |
| 2001/0028145 | A1 | * | 10/2001 | Fukatsu et al. | 271/186 |
| 2003/0046232 | A1 | * | 3/2003 | Peters et al. | 705/43 |
| 2003/0047861 | A1 | * | 3/2003 | Minamishin et al. | 271/10.01 |
| 2003/0118228 | A1 | * | 6/2003 | Mennie et al. | 382/135 |
| 2004/0256784 | A1 | * | 12/2004 | Nomiyama et al. | 271/3.14 |
| 2005/0041240 | A1 | * | 2/2005 | Jespersen et al. | 356/218 |
| 2005/0098622 | A1 | * | 5/2005 | Jantsch | 235/379 |
| 2006/0202021 | A1 | * | 9/2006 | VanKirk et al. | 235/379 |
| 2007/0034683 | A1 | * | 2/2007 | Eastman et al. | 235/379 |
| 2009/0057423 | A1 | * | 3/2009 | Nobuhara et al. | 235/7 A |

* cited by examiner

*Primary Examiner*—Daniel Walsh
(74) *Attorney, Agent, or Firm*—Michael Chan, Esq.

(57) ABSTRACT

A method of operating a self-service terminal is described in which a stack of media is presented to a customer. If it is detected that at least some of the stack remains within the terminal, the remaining media is advanced out of the self-service terminal.

12 Claims, 7 Drawing Sheets

PRESENTING MISALIGNED STACKS OF MEDIA

TECHNICAL FIELD

The present invention relates to the presentation of items of sheet media to a customer. It is particularly related to, but in no way limited to, the presentation of poorly aligned bank notes to a customer of an Automated Teller Machine (ATM).

BACKGROUND

Automated Teller Machines (ATMs) dispense bank notes by picking the required number of notes from an internal store, compiling those notes into a stack and presenting them through the fascia of the ATM for collection by the customer.

In order to ensure the customer can collect all of the bank notes the stack must be sufficiently extended from the fascia to allow the customer to grasp the bank notes, but must still be retained securely by the ATM such that the bank notes do not fall out of the ATM without being grasped by the customer.

During use bank notes become worn, in particular accumulating folds such that they are not flat. As a result worn notes are difficult to handle repeatably and when formed into a stack, the notes may not be well aligned with each other. This may be detected by transport sensors within the ATM which detect that the stack is longer than it should be (i.e. it is longer than the longest note within the stack) and upon detection, the badly aligned stack of notes may be deposited into the purge bin and not presented to the customer. As the purge bin has a limited capacity, repeated rejection of stacks of notes results in the purge bin becoming full. When the purge bin is full, the ATM must be taken out of operation until the purge bin has been emptied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of operating a self-service terminal is described in which a stack of media is presented to a customer. If it is detected that at least some of the stack remains within the terminal, the remaining media is advanced out of the self-service terminal.

A first aspect provides a method of operating a self-service terminal, the method comprising: moving a stack of media along a media path to a dispense position; determining if, after a first period of time, at least a portion of the stack remains in the media path; and if at least a portion of the stack remains in the media path, advancing said at least a portion of the stack along the media path.

The method may further comprise: repeating the determining and advancing steps until at least a portion of the stack does not remain in media path.

The step of advancing said at least a portion of the stack along the media path may comprise: advancing said at least a portion of the stack a predefined distance along the media path. In another example, advancing said at least a portion of the stack along the media path may comprise: advancing said at least a portion of the stack in a plurality of steps of a predefined distance along the media path. In a further example, advancing said at least a portion of the stack along the media path may comprise: advancing said at least a portion of the stack at a slow speed along the media path.

The step of determining if at least a portion of the stack remains in the media path may comprise: determining if an exit sensor detects at least a portion of the stack. In another example, it may comprise determining if a portion of the stack has been removed from the media path, and this may be achieved by detecting an increase in incident light at an optical exit sensor.

The method may further comprise: measuring a length of said stack of media; and if said length does not exceed a first threshold, performing said determining and advancing steps.

The method may further comprise: providing at least one of a visual and an audible alert substantially at the same time as advancing said at least a portion of the stack along the media path.

The self-service terminal may be an automated teller machine and the stack of media may comprise a stack of bank notes.

A second aspect provides an automated teller machine (ATM) comprising: a user interface; a media path to a dispensing aperture; an exit sensor proximate to the dispensing aperture arranged to detect media in said media path; and control means for controlling motion of a stack of media along said media path, wherein said control means is arranged: to move a stack of media along the media path to a dispense position; to determine using said exit sensor if after a first period of time at least a portion of the stack remains in the media path; and to advance said at least a portion of the stack along the media path through the dispensing aperture if said at least a portion of the stack remains in the media path.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
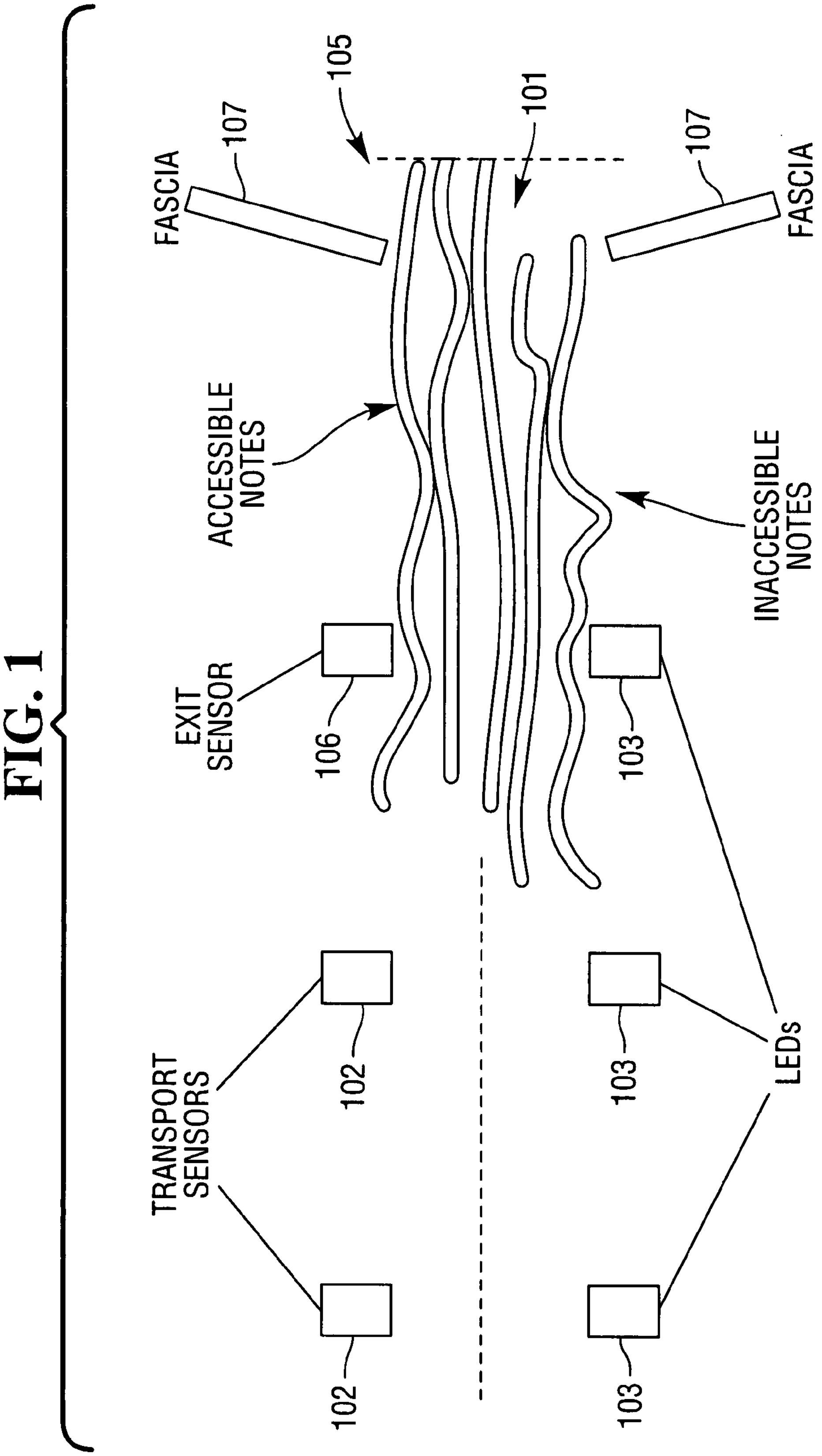
FIG. 1 is a schematic diagram of the exit portion of a dispenser within an ATM or other self-service terminal.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

In order to reduce the number of notes which are placed in the purge bin, a poorly aligned stack of notes may be presented to a customer, as shown in FIG. 1. FIG. 1 shows a schematic diagram of the exit portion of a dispenser within an ATM or other self-service terminal. The stack of notes 101, which has been assembled at an earlier point within the dispenser, is fed between a pair of belts (not shown in FIG. 1) past one or more transport sensors 102. These sensors may be optical sensors with light sources, such as LEDs 103, aligned with the sensors on the opposite side of the media path (marked with dotted line 104). When the leading edge 105 of the stack 101 is detected by the exit sensor 106, the stack is moved forward an additional pre-set distance to arrive at the correct dispense position. In this position, a well aligned stack of notes should be easily grasped by a user of the ATM. However, as shown in FIG. 1, if the bank notes in a stack are not well aligned, when the stack is presented through the fascia 107 some of the bank notes will extend further than others. As a result some of the notes may not extend sufficiently far to be grasped by the customer, thereby making their collection difficult. If after a defined period of time, the exit sensor has not cleared (e.g. because some of the notes have not been removed by the customer), the remaining notes are retracted back into the ATM and placed in the purge bin. This is not a satisfactory situation because the operator of the ATM does not know how many notes were taken by the customer and how many have been placed in the purge bin and consequently it may be necessary to take the machine out of service and investigate further. Additionally, the customer only receives some of the notes and therefore will need to contact their bank to rectify the amount debited from their account. Alternatively the stack may be extended further through the fascia, however, if the stack is extended sufficiently far for the rear-most bank notes to be grasped, the ATM may lose its grip on the front-most notes, and those notes may be lost.

In order that stacks of notes which are not well aligned can be dispensed, the ATM may advance the stack slowly through the dispense slot to a position which is beyond the normal dispense position. By advancing the stack slowly (either in a continuous manner or in small steps), the user of the ATM has time to collect the notes as they become sufficiently extended through the fascia that they can be grasped. Various embodiments of this method are described in more detail below.

Figure 2:
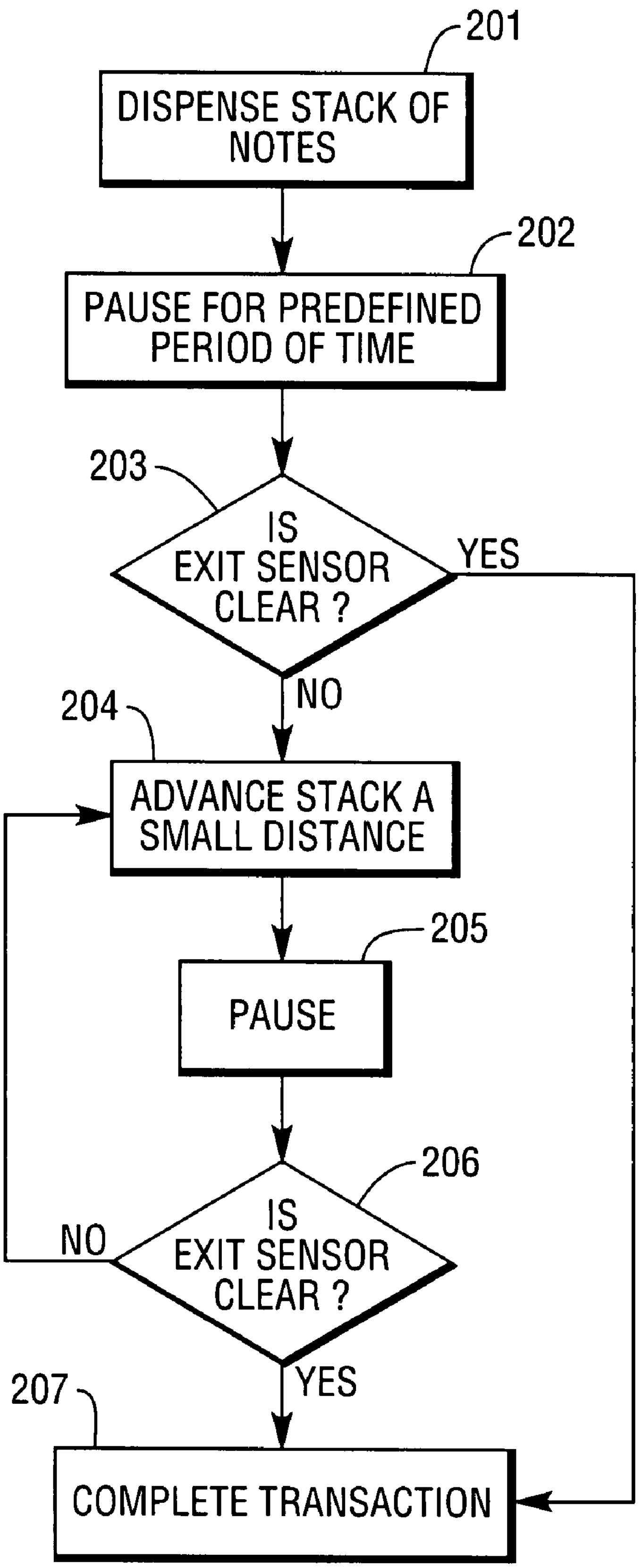
FIG. 2 is a flow diagram of a first method of dispensing notes from a self-service terminal.

FIG. 2 shows a first method of dispensing notes from a self-service terminal, such as an ATM, which enables dispensing of badly aligned stacks of notes (or other media). The stack of notes is dispensed (block 201 e.g. in the standard manner such that the leading edge is a predefined distance beyond the exit sensor or other reference point) and after a defined period of time (block 202), if the exit sensor is not clear ('No' in block 203), the stack is advanced by a small distance (block 204). Again, after a defined period of time (block 205), which may be the same as the earlier defined period or different, if the exit sensor is not clear ('No' in block 206), the stack is advanced by a small distance (block 204) and this process (blocks 204-206) is repeated until the exit sensor is clear ('Yes' in block 206), when the transaction is completed (block 207, e.g. the shutter is closed and the ATM prepared for the next transaction). If initially, the exit sensor becomes clear within the first defined period of time ('Yes' in block 203 following the pause of block 202), the transaction is completed (block 207).

Figure 3:
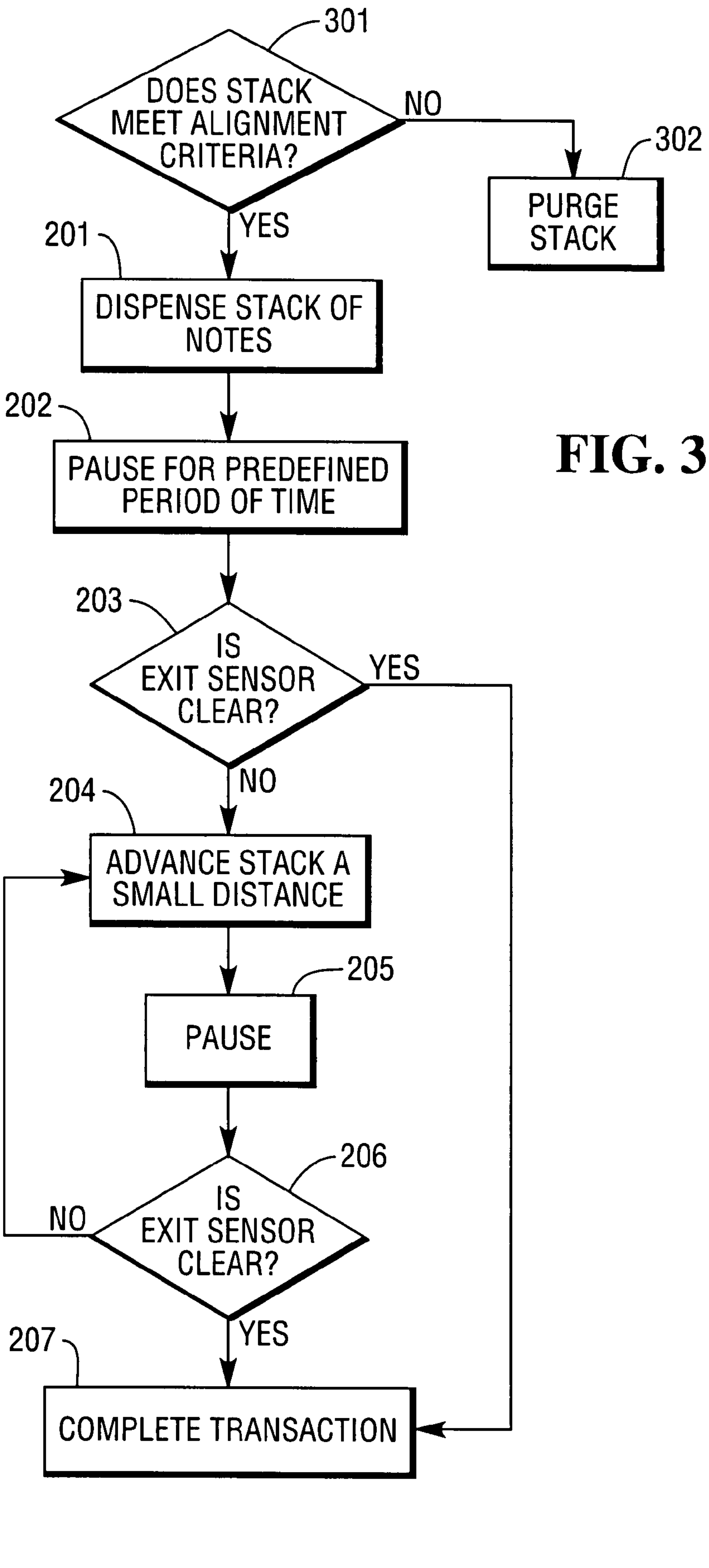
FIG. 3 is a flow diagram of a second method of dispensing notes from a self-service terminal and FIG. 4 shows an example implementation of a step from the method shown in FIG. 3.
Figure 4:
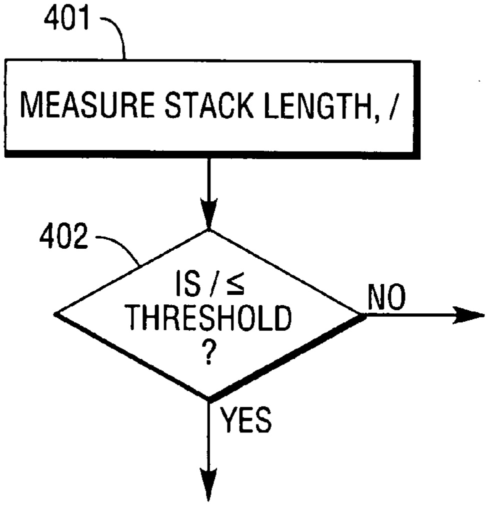

FIG. 3 shows a second method of dispensing notes from a self-service terminal in which the operator of the terminal can configure the degree of misalignment of the stack of notes which is acceptable, such that the notes are still dispensed, and therefore control the degree of misalignment which will result in the purging of the entire stack. Aspects of the stack of notes are measured (or otherwise determined) and if the stack meets alignment criteria ('Yes' in block 301), which may be set by the terminal operator, the stack is dispensed, for example in a similar manner to that shown in FIG. 2 and described above. If however, the stack does not satisfy the alignment criteria which have been set ('No' in block 301), the stack of notes is purged (block 302). In an example, the alignment criteria may be defined in terms of a length threshold for the stack. Where the notes are all aligned, the length of the stack will be equal to the length of the longest note, whilst if the notes are not well aligned, the stack of notes will be longer (as can be seen from the stack 101 shown in FIG. 1). FIG. 4 shows an example implementation of block 301 from FIG. 3, in which the stack length is measured (block 401) and if the stack length exceeds the defined threshold, the stack is purged ('No' in block 402, resulting in block 302). If the stack length does not exceed the threshold ('Yes' in block 402), then it can be dispensed (e.g. blocks 201-207 as shown in FIGS. 2 and 3).

In an example, the length of the longest note in a stack to be dispensed may be 66 mm. The threshold (as used in block 402) may be set at 75 mm. Where the stack is sufficiently misaligned that the overall stack length is greater than 75 mm, the stack may be purged. Where the stack length is 75 mm or less, the stack is dispensed (e.g. using the method of FIG. 2).

In a modification of the methods described above with reference to FIGS. 3 and 4, the stack may be dispensed in a conventional manner where the length of the stack does not exceed the defined threshold, i.e. the stack may be presented in a single position and if the notes are not removed within a defined period, the stack is retracted into the terminal and deposited in the purge bin. If the length of the stack does exceed the defined threshold, the stack may be presented using one of the methods described herein (e.g. FIG. 2 or FIG. 6) where the stack is advanced incrementally if the notes are not initially all retrieved by the customer.

Figure 5:
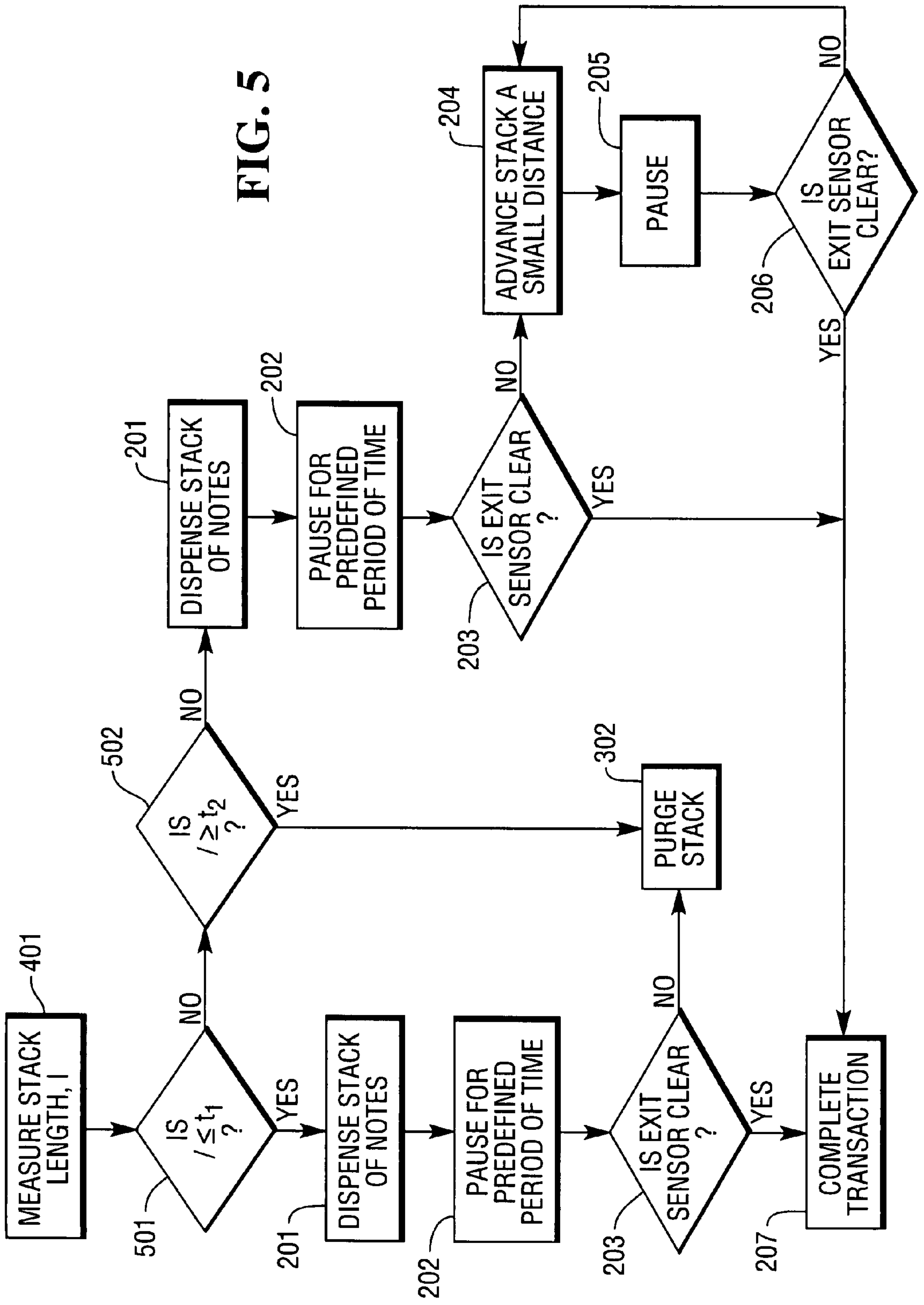

In a further example method, as shown in FIG. 5, two thresholds may be configured and in the example shown this threshold may be defined in terms of stack length, as described above. If the length (as measured in block 401) does not exceed a first threshold, $t_1$, ('Yes' in block 501) it may be dispensed in a standard manner (e.g. blocks 202, 202, 203, 207) with the stack being purged if the terminal customer fails to take the notes ('No' in block 203 followed by block 302). This first threshold may be set close to the length of the longest note such that it defines a well aligned stack of notes. If the length exceeds a second threshold, $t_2$, where $t_2>t_1$, it may be purged ('No' in block 501, 'Yes' in block 502, followed by block 302), with this second threshold defining a stack of notes which is so poorly aligned that it should not be dispensed. In an example, this second threshold may be set to twice the length of the longest note. If the length, l, falls between the two thresholds, ($t_1<l\leqq t_2$, 'No' in both blocks 501 and 502), the stack may be dispensed according to the method shown in FIG. 2, FIG. 6 or any other method described herein.

In the methods described above, there is a pause (block 202) during which time the customer is expected to take the notes which are extended far enough through the fascia that they can be grasped. In an alternative embodiment, an exit sensor may be used which is capable of detecting when some, but not all, of the notes within a stack have been removed from the dispenser. Exit sensors generally operate on the basis of detection of the presence or absence of light emitted by the LED 103 which is aligned with the exit sensor 106 and located on the opposite side of the media path 104. In this situation, the LED is selected such that when one or more notes are located in the media path between the exit sensor and the LED, all the light is blocked and none reaches the sensor (or a level below a defined threshold). Alternatively, a more powerful LED (and/or a different wavelength) may be used such that a proportion of the light is able to pass through a number of notes and be incident on the exit sensor. In this arrangement, the exit sensor may detect changes in the light level and from this determine that the number of notes in the media path between the LED and the exit sensor has changed. It may also be possible to determine the number of notes remaining in the stack, however, this is not essential as the sensor may be used to detect changes rather than absolute numbers of notes. This change in the number of notes in the media path may indicate that the customer of the self-service terminal has removed a number of notes from the stack (e.g. the top three which protrude furthest through the fascia in the example shown in FIG. 1) and therefore this can be used to control when the stack is moved further forward (e.g. in block 204). An example method is shown in FIG. 6, which comprises a modified version of the method of FIG. 2 described above.

Figure 6:
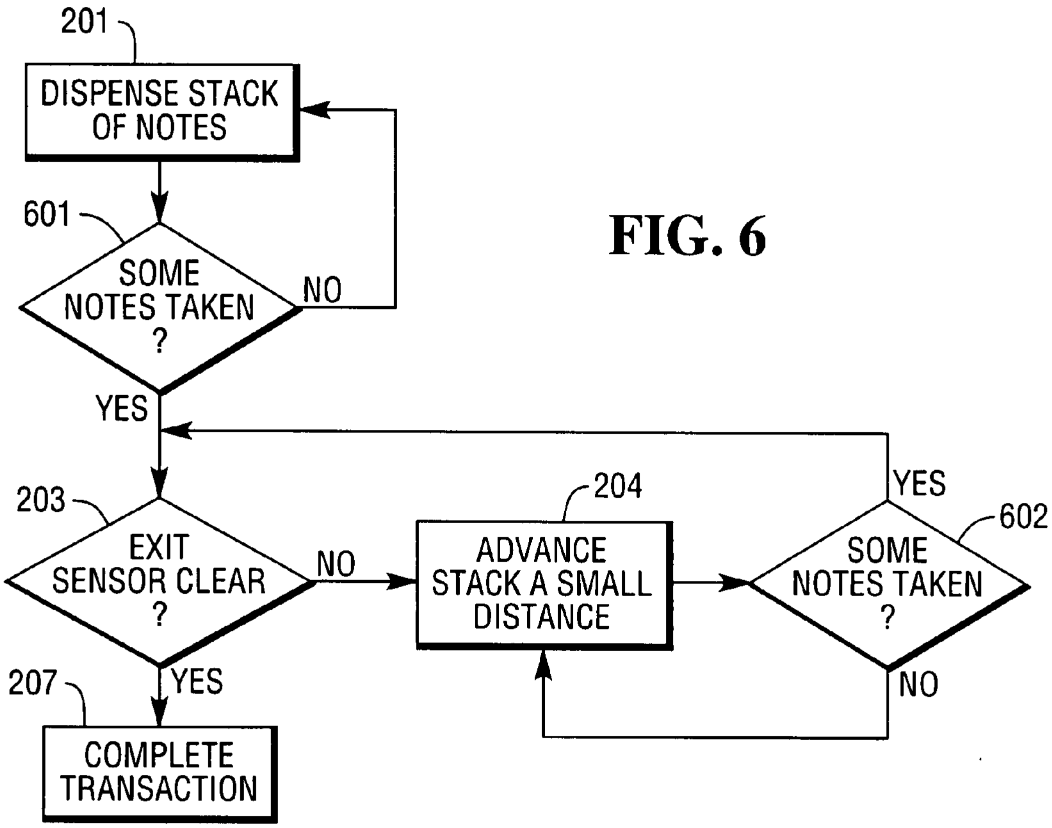
FIGS. 5 and 6 show flow diagrams of a further methods of dispensing notes from a self-service terminal.

As shown in FIG. 6, the stack of notes is dispensed (block 201) and then it is determined when some notes are removed from the stack ('Yes' in block 601), for example by detection of an increase in the light incident on the exit sensor. The change is analyzed to determine if the exit sensor is now clear (block 203), e.g. whether the detected light level corresponds to there being no notes in the optical path between the LED and the exit sensor, and if the exit sensor is clear ('Yes' in block 203), the transaction is completed (block 207). However, if there are still further notes to be dispensed ('No' in block 203), the stack is advanced a small distance further through the fascia (block 204). If some notes are then detected as being taken ('Yes' in block 602), it may be determined if the exit sensor is now clear (block 203) and the process (blocks 204, 602 and 203) may be repeated. If however, the advance in the stack of notes does not result in detection of the removal of further notes ('No' in block 602), the stack may be advanced again (block 204) and the process may be repeated. This method may operate until the exit sensor is clear ('Yes' in block 203 followed by block 207) or alternatively the method may include a time-out mechanism such that if the stack has not been completely removed from the dispenser within a defined time limit, the notes are retracted within the terminal and placed in the purge bin.

When the stack is advanced (e.g. in block 204 of any of the methods described herein), an alert may be provided to the user of the terminal. This may be in the form of an audible alert such as a series of beeps or other tones or a recorded message, and/or in the form of a visual alert, such as a flashing LED which may be located proximate to the dispensing slot of the terminal. The visual alert may alternatively (or in addition) comprise information displayed on the screen of the self-service terminal indicating that the stack is advancing and that the user should take the additional notes. This information may, in some examples, be displayed on the self-service terminal prior to the advancing of the stack (prior to block 204, for example, once the poorly aligned stack has been detected).

Figure 7:
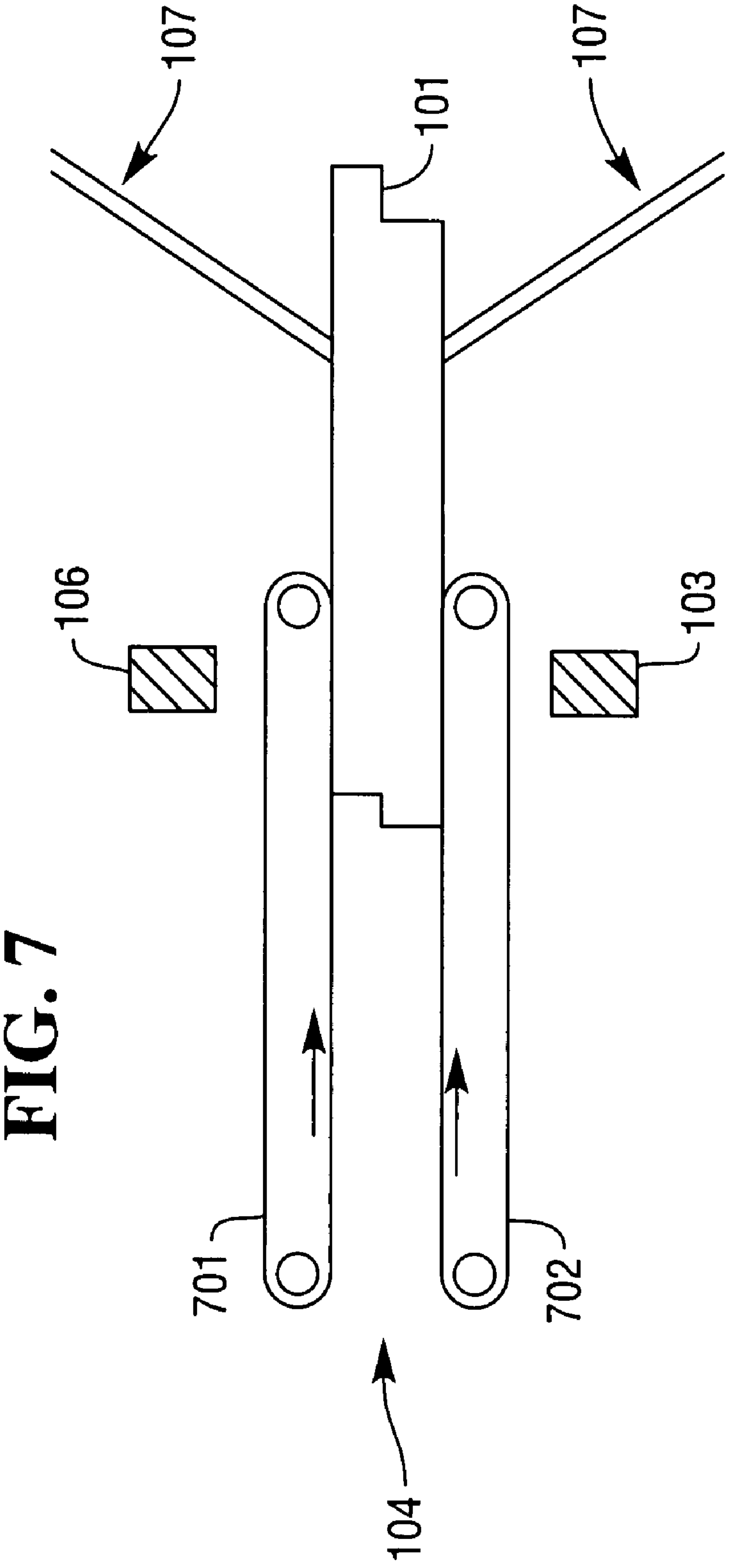
FIGS. 7 and 8 show further schematic diagrams of the exit portion of a dispenser within an ATM or other self-service terminal.
Figure 8:
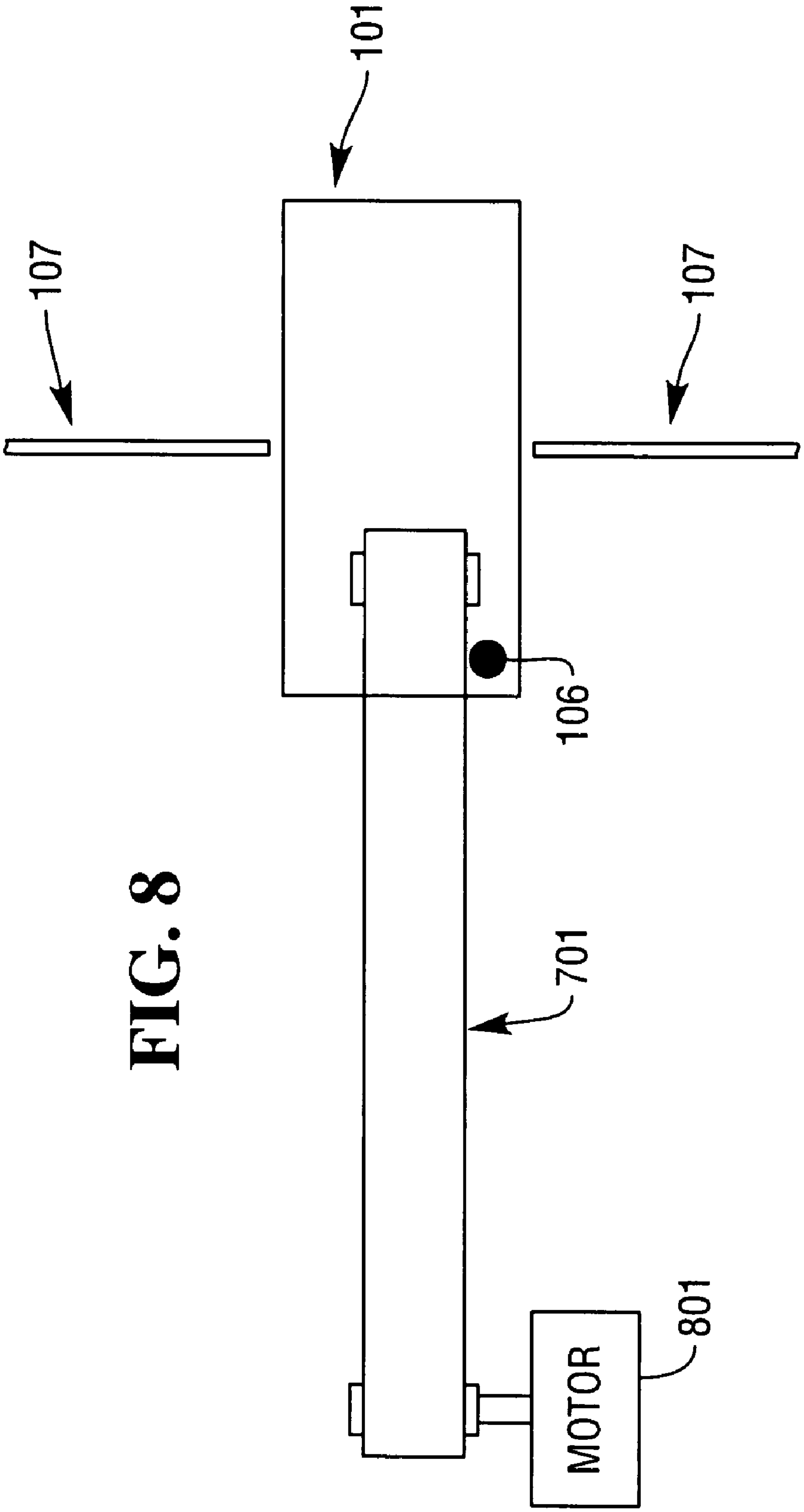

The stack may be advanced by controlling the one or more motors 801 (which may be stepper motors) which are used to drive the belts 701, 702 between which the stack of notes 101 is held, as shown in FIGS. 7 (side view) and 8 (view from above).

The distance by which the stack is advanced (in block 204) may be fixed in terms of distance (e.g. 5 mm) or may be dependent upon the size of the largest note within the stack (e.g. one twentieth of the largest note length), and the distance may be configurable by the operator of the self-service terminal. In other examples, the distance by which the stack is advanced may depend on a measured parameter associated with the stack, such as the length of the stack (e.g. as measured in block 401). Where the stack is advanced in multiple steps (i.e. through repetition of block 204), the steps may all be the same size (e.g. each advancing the stack by 5 mm) or may be of different sizes (e.g. 5 mm, followed by 10 mm, followed by 15 mm etc).

Some of the methods described above include a number of pauses (e.g. blocks 202 and 205). The initial pause (in block 202) in which time the user of the terminal is expected to remove the notes from the dispensing slot, may be 30 seconds in length, whilst the pause between advancement of the stack (in block 205) may be shorter (e.g. 10 seconds). In other examples, these two pauses may be the same length. The length of the second pause (in block 205) may be dependent on the distance by which the stack is advanced. For example, where the stack is advanced by a larger amount, the pause before the next advance of the stack may be longer. This is to ensure that the customer has time to grasp the newly extended notes before they are ejected from the ATM.

Whilst in the above examples, the stack is advanced in small steps (in block 204) which are spaced in time, in other embodiments, the stack may be advanced substantially continuously at a slow speed (e.g. at a speed of 3 cm/min). In such an embodiment, the stack is advanced at a significantly slower speed than is used to present the stack initially through the slot in the fascia of the terminal (e.g. in block 201).

By using one of the methods described herein, the probability of successful dispensing of a stack of notes may be increased and the numbers of notes being deposited in the purge bin may be decreased. This has the result that the self-service terminal will require less manual intervention (e.g. when the purge bin fills up), will be operational for longer and will increase customer satisfaction (e.g. less situations where the dispensing is unsuccessful requiring the customer to contact the bank and correct any amounts debited from their account).

The methods described above show various combinations of method steps and it will be appreciated that aspects of any of the methods described above may be combined in different ways to create further example methods. For example, the test in block 301 may be combined with the method shown in FIG. 6 if the stack meets the alignment criteria (i.e. 'Yes' in block 301 may be followed by the method of FIG. 6 rather than the method of FIG. 2). In another example, aspects of the methods of FIGS. 2 and 6 may be combined, such that the initial advancing of the stack is based on a detection of a change in the number of notes in the optical path between the exit sensor and the LED (block 601) but subsequently the stack may be advanced in steps until the exit sensor is clear (as shown in blocks 204-206 of FIG. 2).

Whilst the above description relates to the dispensing of bank notes from an ATM, this is by way of example only. The invention is applicable to any sheet media dispensing system, such as any self-service terminal and the media may alternatively be tickets, plastic cards or any other type of sheet media.

Whilst the above description and methods refer to the dispensing of badly aligned stacks of media, the methods may be implemented for any stacks of media. For example, where the operator of the terminal wishes to ensure that the stack is always dispensed to the customer, the methods described may be used and there may be no requirement to determine whether the stack is poorly or well aligned.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The methods described herein may be performed by software in machine readable form on a storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

What is claimed is:

1. A method of operating a self-service terminal, the method comprising:

moving a stack of media along a media path to a dispense position;

determining if, after a first period of time, at least a portion of the stack remains in the media path;

if at least a portion of the stack remains in the media path, advancing said at least a portion of the stack along the media path;

measuring a length of said stack of media; and if said length does not exceed a first threshold, performing said determining and advancing steps.

2. A method according to claim 1, further comprising:

repeating the determining and advancing steps until at least a portion of the stack does not remain in media path.

3. A method according to claim 1, wherein advancing said at least a portion of the stack along the media path comprises:

advancing said at least a portion of the stack a predefined distance along the media path.

4. A method according to claim 1, wherein advancing said at least a portion of the stack along the media path comprises:

advancing said at least a portion of the stack in a plurality of steps of a predefined distance along the media path.

5. A method according to claim 1, wherein advancing said at least a portion of the stack along the media path comprises:

advancing said at least a portion of the stack at a slow speed along the media path.

6. A method according to claim 1, wherein determining if at least a portion of the stack remains in the media path comprises:

determining if an exit sensor detects at least a portion of the stack.

7. A method according to claim 1, wherein determining if at least a portion of the stack remains in the media path comprises:

determining if a portion of the stack has been removed from the media path.

8. A method according to claim 7, wherein determining if a portion of the stack has been removed from the media path comprises:

detecting an increase in incident light at an optical exit sensor.

9. A method according to claim 1, further comprising:

providing at least one of a visual and an audible alert substantially at the same time as said advancing said at least a portion of the stack along the media path.

10. A method according to claim 1, wherein the self-service terminal is an automated teller machine.

11. A method according to claim 1, wherein the stack of media comprises a stack of bank notes.

12. An automated teller machine (ATM) comprising:

a user interface;

a media path to a dispensing aperture;

an exit sensor proximate to the dispensing aperture arranged to detect media in said media path; and control means for controlling motion of a stack of media along said media path, wherein said control means is arranged:

to move a stack of media along the media path to a dispense position;

to determine using said exit sensor if after a first period of time at least a portion of the stack remains in the media path;

to advance said at least a portion of the stack along the media path through the dispensing aperture if said at least a portion of the stack remains in the media path;

to measure a length of said stack of media; and if said length does not exceed a first threshold, to perform said determining and advancing steps.

* * * * *